Oct. 30, 1962     A. O. PIEPER     3,061,322

SCREW MACHINE CHUCK

Filed July 10, 1961

ARTHUR O. PIEPER
INVENTOR.

BY Harold E. Stonebraker his ATTORNEY

United States Patent Office 3,061,322
Patented Oct. 30, 1962

3,061,322
SCREW MACHINE CHUCK
Arthur O. Pieper, 105 Trevor Court Road,
Rochester 10, N.Y.
Filed July 10, 1961, Ser. No. 122,872
8 Claims. (Cl. 279—123)

This invention relates to a chuck such as employed in conventional screw machines for holding the rod intermittently as it travels through the machine, and has for its principal objective to afford a ceramic or refractory structure that will withstand frequent gripping operations on the rod without chipping or breaking, and will wear much longer than metal chucks now in use without requiring replacement.

In conventional screw machines, the chuck for gripping the rod includes two metal members having symmetrical surfaces including grooves longitudinally arranged therein for engaging and gripping the rod, and more specifically, the purpose of the invention is to afford a ceramic or refractory surface for engaging the rod, and to fasten such ceramic surface or element to a metal or plastic holder in such manner that the holder and ceramic insert are as solidly connected and rigid as a one piece metal chuck, while possessing the wearing qualities and fracture-resisting qualities of a ceramic body when in gripping contact with the rod as it travels through the machine.

For attaching the ceramic element to the holder, nylon or other suitable plastic material can be molded around the outer exposed surface of the ceramic insert which is formed to interlock with the molded plastic so as to prevent relative turning or relative endwise movement, or where a metal holder is employed, the metal holder may be attached to the ceramic insert by a plate secured to the metal holder and overlying a portion of the ceramic insert, endwise movement of the ceramic insert in either case being prevented by an interlocking transverse rib on the ceramic insert engaging a corresponding transverse groove in the metal holder.

To these and other ends, the invention consists in the construction and arrangement of parts that will appear clearly from the following description when read in conjunction with the accompanying drawings, the novel features being pointed out in the claims following the specification.

Figure 1:
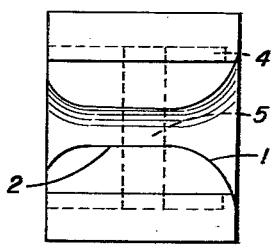
FIG. 1 is a view in elevation looking at the inner surface of the ceramic insert, constructed in accordance with one embodiment of the invention.

Referring more particularly to the drawings in which like reference numerals throughout the several views refer to the same parts, the invention in one embodiment includes a ceramic or refractory insert which is very hard and resistant to wear or fracture, and includes a ceramic insert having a transversely curved exterior surface as indicated at 1, and transversely curved and endwise curved interior surfaces as indicated at 2, which engage and grip the rod 3 for holding the latter, as well known in the screw machine art, and for purposes of present invention, it is deemed unnecessary to illustrate the mechanisms for moving the holders toward and from each other for alternately gripping and releasing the rod 3, since this invention has to do only with the ceramic insert and the structure for fastening together the metal or plastic holder and the ceramic or refractory insert.

Figure 2:
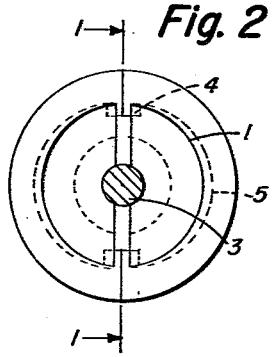
FIG. 2 is an end elevation showing the chuck elements in position for engaging the rod to be held thereby, and illustrating the metal holders formed of nylon or plastic material and molded to the ceramic inserts.
Figure 3:
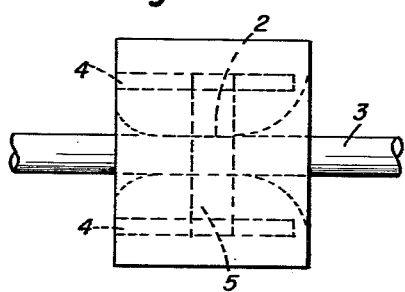
FIG. 3 is a side elevation of the same.

To attain this objective, each ceramic insert is recessed or cut away along its outer edges, as indicated at 4, providing a ledge or shoulder extending along and adjacent to the innermost surface of the ceramic insert, and in the form of the invention illustrated in FIGS. 1 to 3 where nylon or other suitable plastic is molded around the outer surfaces of the ceramic insert, such plastic material covers the notched portion or shoulder on opposite sides of the ceramic insert and thus entirely surrounds the outer curved surface of the insert and the opposite grooved edges of the inner portions of the insert so as to lock it securely against rotating turning movement in the holder, while relative endwise movement of the ceramic insert is prevented by a rib 5 formed transversely on the outer surface of the ceramic insert and interlocking with the surrounding nylon or plastic material which flows around and hardens in engagement with the rib 5, thus securely locking the metal holder and ceramic insert against relative endwise movement.

Figure 4:
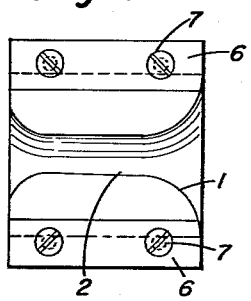
FIG. 4 is a view similar to FIG. 1 showing the ceramic insert secured to the metal holder by plates overlying portions of the ceramic insert and attached to the metal holder.
Figure 5:
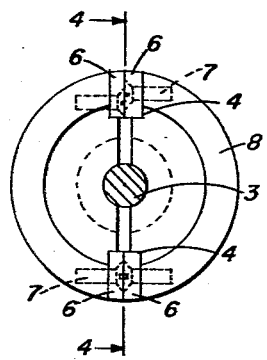
FIG. 5 is a view similar to FIG. 2 with the ceramic inserts secured by plates and screws to the metallic holder.

In another possible embodiment of the invention as illustrated in FIGS. 4 and 5, the ceramic insert is secured within a metal holder by means of a metal plate 6 attached to the metal holder by screws 7 which pass through the metal plate 6 and engage the body of the metal holder 8, the latter being provided with an interior transversely curved surface that engages the outer transversely curved surface of the ceramic insert, while the plate 6 overlies the shoulder or notched portion 4 of the ceramic insert and thus retains the ceramic insert securely in the metal holder. Endwise movement of the ceramic insert in the metal holder may be prevented by having the attaching screws 7 engage a portion of the ceramic insert as they enter the metal holder, or the metal holder may be provided with a transverse groove on its interior surface to receive an interlocking corresponding transverse rib on the ceramic insert engaging the groove and preventing endwise movement of the ceramic insert.

While the structure has been described with reference to the details herein shown, it is not necessarily restricted to the precise form illustrated, and this application is intended to cover such modifications or departures as may come within the purposes of the improvement or the scope of the following claims.

I claim:

1. A screw machine chuck consisting of a pair of rod gripping members, each comprising a holder having a transverse circularly curved inner surface, and a ceramic gripping element having a transverse circularly curved outer surface conforming to said inner surface of the holder, and interlocking means connecting the holder and ceramic gripping element acting to prevent relative rotational and endwise movement of said parts.

2. A screw machine chuck consisting of a pair of rod gripping members, each comprising a holder having a transverse circularly curved inner surface, and a ceramic gripping element having a transverse circularly curved outer surface conforming to said inner surface of the holder, the ceramic gripping member having longitudinally extending recesses at its inner edges affording shoulders and a rib extending transversely of its outer curved surface, and the holder having portions overlying said shoulders and a transverse recess in its inner curved surface engaging said rib, said overlying portions and rib acting to prevent relative rotational and endwise movements of the holder and ceramic insert.

3. A screw machine chuck consisting of a pair of rod gripping members, each comprising a holder having a transverse circularly curved inner surface, and a ceramic gripping element having a transverse circularly curved outer surface conforming to said inner surface of the holder, the ceramic gripping member having longitudinally extending recesses at its inner edges affording shoulders and a rib extending transversely of its outer curved surface, and a fastening plate secured to the holder overlying said shoulders of the ceramic insert, the holder having a transversely arranged recess in its inner curved surface engaging said transverse rib on the ceramic member and interlocking therewith.

4. A screw machine chuck consisting of a pair of rod gripping members, each comprising a plastic holder having a transverse circularly curved inner surface, and a ceramic gripping element having a transverse circularly curved outer surface conforming to said inner surface of the holder, the ceramic gripping member having longitudinally extending recesses at its inner edges affording shoulders and a rib extending transversely of its outer curved surface, the plastic holder overlying said shoulders of the ceramic insert and surrounding said transverse rib on the ceramic member and interlocking therewith.

5. A chuck for intermittently grasping a rod in a screw machine or the like, said chuck comprising two complementary jaw members of generally semi-cyclindrical shape made of hard and fracture-resistant ceramic material, said jaw members having complementary grooves on their respective inner faces for receiving between them the rod to be grasped so that the rod lies partly in the groove in one ceramic jaw member and partly in the groove in the other ceramic jaw member, and a holder having two approximately semi-cylindrical shell portions, each of said shell portions having an inner concave face interlocked with the outer convex face of one of said ceramic jaw members to hold the ceramic jaw member against both rotational and longitudinal movement in its shell portion, each of said shell portions having an outer convex face which, in combination with the corresponding face of the other shell portion, is adapted to fit in a conventional chuck holder of a conventional screw machine.

6. A construction as defined in claim 5, in which the interlock between a ceramic jaw portion and its shell portion includes a circumferentially extending rib integrally formed on the outer convex face of the jaw portion, and a corresponding groove in the inner concave face of the shell portion.

7. A construction as defined in claim 5, in which each of said shell portions is formed mainly of metal.

8. A construction as defined in claim 5, in which each of said shell portions is formed mainly of plastic material.

References Cited in the file of this patent
UNITED STATES PATENTS

| | | |
|---|---|---|
| 1,900,922 | Evans | Mar. 14, 1933 |
| 1,980,081 | Ovington | Nov. 6, 1934 |
| 2,421,563 | Ingalls | June 3, 1947 |